Figure 1:
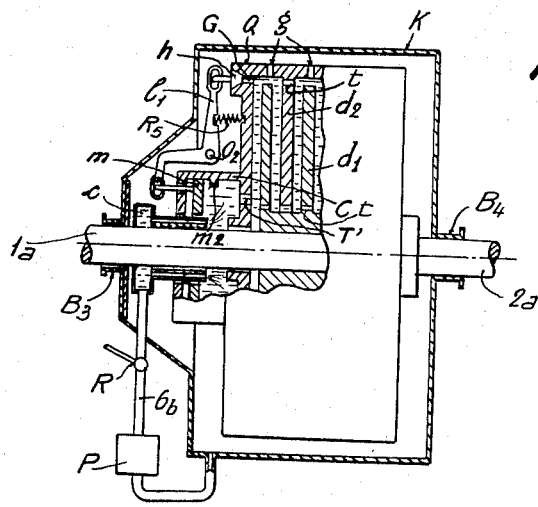

INVENTORS:
ALFRED LOUIS TENOT AND
ROLAND ANDRÉ PICAND
BY:

United States Patent Office 2,714,946
Patented Aug. 9, 1955

2,714,946

HYDRAULIC TRANSMISSION

André Louis Tenot, Nogent-sur-Marne, and Roland André Picand, Angers, France

Application December 6, 1949, Serial No. 131,370

Claims priority, application France December 8, 1948

5 Claims. (Cl. 192—58)

Our invention refers to equipment intended for transmission of the power of a machine, from a driving shaft to a driven shaft, while avoiding the coming in contact between solid parts, through making use of a thick fluid that is placed between them.

It consists mainly in assembling on the primary or driving shaft a set of surfaces of revolution, and on the secondary shaft or driven shaft a set of surfaces of revolution that are parallel with the first set and overlapping between them, the clearance available between these surfaces being filled with a fluid, preferably thick, such as oil or silicon derivative. The distance between the walls of these surfaces of revolution, their average radii, the active length of their generating line, the speed of the entering shaft, the degree of viscosity of the fluid in which they are plunged, finally the molecular affinities and the surface conditions, are factors that affect the scale of the torque capable of being transmitted by the equipment, for a given amount of sliding, between the two shafts, primary and secondary.

The surfaces of revolution may be, for example cylindrical or in the shape of discs with plane or corrugated surfaces (that is to say made up of connected annular surfaces) or cone-shaped.

For the adjustment of the torque to be transmitted it may be possible to alter in a mechanical manner the extent of the active surfaces facing one another, or the distance by which they may be apart.

On the other hand, the centrifugal action on the liquid rings has the tendency to drive the liquid towards the periphery, calibrated openings enabling the discharge of the latter to take place. In accordance with our invention, a continuous circulation of the liquid may be set up, while the latter is picked up at the outlet of these openings and sent back to the apparatus by means of a pump with adjustable delivery. There ensues from this a continuous liquid circulation between the surfaces (discs or cones) from the centre to the periphery. There is thus, therefore, a continual replacement of the liquid, that has been overheated by the viscosity effects, by a cooled liquid. For this purpose, the overheated liquid leaving from the discs gives up its heat units, either through radiation, or by going into a radiator provided for this object, then it is picked up again by the pump so as to rejoin the circuit.

The adjustment of the torque may be carried out by acting on the amount of liquid available in the apparatus and consequently on the active surface between the liquid rings and the revolving surfaces.

For this purpose, for a given rated speed, all that has to be done is to adjust the delivery of the pump to a certain figure by means of some standard device. There is then set up in an automatic way a balance between the delivery of liquid from the pump, and the delivery discharged through centrifugal action on the liquid rings. The adjustment might be effected by causing a variation in the cross-sectional area of the holes that discharge the liquid on its outlet from the discs. The adjustment may be made through a cooperation of the two previous methods by taking action on the delivery at the outlet from the discs.

It may be possible likewise, for the carrying out of this adjustment, to take action on the temperature of the fluid, therefore on the degree of viscosity, by causing a more or less high degree of cooling of the liquid in the circuit included between the outlet from the discs and its introduction again between these discs. A thermostat might be brought in for effecting an automatic adjustment through making use of standard devices.

These various arrangements or methods of adjustment may be utilized singly or combined together, they may be controlled by hand, or in an automatic manner by auxiliary motors brought under control at a parameter of the machine (torque, speed, etc.) on which the equipment is set up.

The invention is furthermore provided with the following characteristics:

(a) The liquid feeding of the assembly formed by the paired surfaces may be carried out through a centrifugal rotating feeding device, formed by a ring-shaped capacity open at the centre and in communication with the assembly through an opening that is close to its periphery.

(b) When the revolving surfaces are formed by comparatively flexible discs, the latter are held spaced apart by the required amount through projections or elastic feather-keys.

(c) The adjustment may be effected by a lengthwise movement of the assembly of the surfaces of one set in relation to the other set.

(d) The disengaging may be provided through speedy discharge of the liquid by means of openings of comparatively large cross section furnished with valves or similar means, located in the vicinity of the periphery of the rotating assembly.

(e) The control of the discharge through these openings may be effected by means of a piston actuated by the pressure arising from the centrifugal action of the liquid enclosed in a ring-shaped space, with the provision of means for adjusting the entry of this liquid.

(f) The control of the movement of the coupled surfaces in relation to each other may likewise be effected through this same means.

Figure 2:
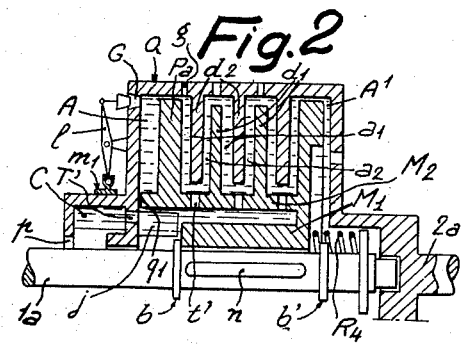
Figure 3:
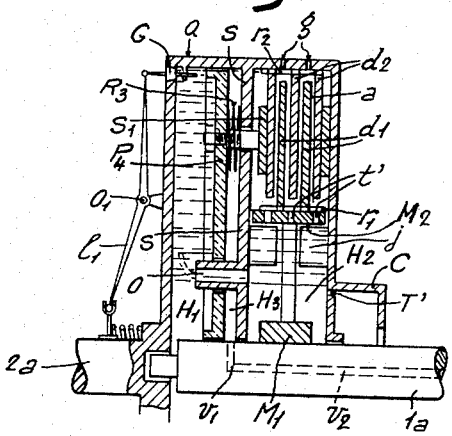

Various other characteristics of our invention will make their appearance hereinunder during the course of the disclosure of the various methods of carrying it out that will now be given as examples taken in connection with the accompanying drawings, in which Fig. 1 is a partly sectional and partly diagrammatic view of one possible apparatus constructed in accordance with the present invention;

Fig. 2 is a fragmentary partly sectional view of a different embodiment of the invention showing a different arrangement of motion transmitting members and liquid control from that shown in Fig. 1; and Fig. 3 is a fragmentary partly sectional view of a third embodiment of the invention showing still another arrangement of transmission members.

In the structure illustrated in Fig. 1 the arrangement includes paired surfaces in the form of discs which cooperate to transmit the drive.

$2a$ is the primary or driving shaft rotating at the angular speed driven by a motor for instance.

$1a$ is the secondary or driven shaft revolving at the angular speed driving a receiver;

$d_1$ are discs fixed rigidly with the secondary shaft $1a$;

$d_2$ are discs extending inwardly from a cylindrical casing Q which is fixed rigidly with the primary shaft $2a$;

P is the pump, driven preferably by the primary shaft;

$t$ are the counterbalancing holes drilled in the discs so that liquid rings may fill the spaces between the discs;

$g$ are calibrated holes formed in casing Q and constituting jets through which the liquid flows out by reason of the centrifugal action on rings;

K is a fixed casing which collects liquid discharged through openings and which delivers this liquid to pump P, the latter returning the liquid to the interior of casing Q in a manner described below;

$B_3$ and $B_4$ are pillow-blocks or ball-bearings enabling the respective rotation to be effected between the shafts $1a$ and $2a$ in relation to the casing K. Watertight joints, not shown, are located at $B_3$ and $B_4$ to prevent any leakage of the liquid outside the casing K.

As soon as the shaft $2a$ turns, the pump P for feeding the liquid turns likewise and sends liquid between the discs. With the secondary shaft at rest, the discs $d_1$ are likewise at rest, and there is then a torque formed owing to the degree of viscosity of the liquid located between the series of moving discs $d_2$ and the series of stationary discs $d_1$. When this torque reaches the size of the torque to be transmitted to the shaft $1a$, the latter starts up. Under the effect of the centrifugal force, the fluid flows off through the jets $g$ and falls into the bottom of the casing K constituting a tank, from where it is picked up by the pump P and starts again in the circuit. A cooling radiator, not shown, may be placed between the outlet from the casing K and the return of the liquid into the revolving casing Q.

This is an interesting arrangement, more particularly as it enables the liquid to be distributed in the shape of a ring, through centrifugal action as soon as the primary shaft revolves, even before engaging or driving of the secondary shaft.

In the various figures, the revolving paired surfaces which cooperate to transmit the drive are in the shape of discs, although they might be otherwise.

In Figures 1–3 the feeding of the liquid is effected by means of a centrifugal feeding device constituted by an annular chamber C fixed rigidly with one of the sets of revolving surfaces. This chamber C is fixed rigidly with the revolving casing Q, that carries the discs $d_2$ and is fixed to the primary shaft $2a$. Holes T′ place this chamber in communication with the inside of the apparatus. Another stationary annular chamber $c$ is in communication through a pipe $6b$, provided with a cock R, with the pump P for feeding liquid. No watertight joints are required between the chamber $c$ and the revolving annular chamber C on the one hand and the driven shaft $1a$ on the other hand.

The feed operates in the following way:

When the primary shaft $2a$ turns, thus driving the revolving casing Q, as well as the pump P (itself driven by the primary shaft), and as soon as the cock R is open, the liquid comes into the annular chamber $c$ and overflows into the revolving annular chamber C that may be provided possibly with radial partitions for drawing of the liquid (not shown). The liquid that is then in the revolving chamber C is drawn in rotation either under the effect of its viscosity, or under the effect of the radial partitions. There is therefore a revolving liquid ring in which the pressure increases as a function of the radius. The liquid flows through the holes T′ into casing Q and then is distributed through the holes $t$ formed in discs $d_2$ adjacent their outer peripheries and in discs $d_1$ adjacent their inner peripheries.

The arrangement of Fig. 2 includes an adjustment of the thickness of the liquid rings through longitudinal movement of the whole of the discs $d_1$ in relation to the discs $d_2$. A similar device would enable the movement of the discs $d_2$ to be worked.) For this purpose, the discs $d_1$ are fastened on a sleeve $M_1$ driven in rotation by the secondary shaft $1a$ but that may be moved longitudinally on the latter (driving by cotters or else by paired longitudinal grooves and keys $n$).

At the moment of starting up, the apparatus contains no liquid; the primary shaft $2a$ alone turns drawing the discs $d_2$. The feed of liquid, as supplied by the pump P, is opened. The liquid rings $a_1$, $a_2$, take shape but the torque transmitted is very slight since these rings have a comparatively large thickness (as an example, several millimeters). Through a ball-bearing stop and a system of levers not shown (standard arrangement of which use is made in disc clutches), the sleeve $M_1$ is then moved longitudinally to the right, its movement being limited by a stop $b_1$; the result is that the liquid rings $a_1$ decrease in thickness while the liquid rings $a_2$ increase in thickness. The axial thrust is balanced by the stop $b'$. Calculations and experiment demonstrate that the torque transmitted through viscosity is inversely proportional to the thickness of the films or liquid rings, it results that there is an increase in the torque transmitted. It will be pointed out, as an example only, that the sleeve $M_1$ may be pushed so that the films $a_1$ are not more than several tenths or several hundredths of millimeters in thickness. It must be observed that the longitudinal operating of the sleeve $M_1$ does not require a large force on account of the liquid thrusts, the latter being balanced on each side of the discs.

A modification for the working of this movement of the sleeve $M_1$ consists in making use of the thrust of the liquid on a piston $P_a$ fixed rigidly with this sleeve on which acts a liquid ring A, set up by the coming of the liquid through the passages $p$ and $q_1$. When declutching, the feeding of liquid is cut; that present in the apparatus is drained off through the jets $g$. As soon as the thrust of the ring A on the piston $P_a$ becomes less than the action of a close-coil spring $R_4$ and of the pressure of the ring $A_1$, the latter brings the sleeve $M_1$ and the discs $d_1$ to a position marked by a stop $b$ so that the liquid rings $a_1$ and $a_2$ are substantially of equal thickness. As this thickness is in the nature of several millimeters, the liquid under the action of the centrifugal force may be expelled entirely and moreover, there is no danger of friction of the discs $d_1$ against the discs $d_2$ which enables a perfect declutching to be obtained. It must be noted that during working at the engaged position (films $a_1$ of some hundredths or tenths of millimeters, rings $a_2$ of several millimeters, for instance), under the influence of the centrifugal force, and on account of the jets $g$, the liquid flows very easily especially through the thick rings $a_2$, which produces the removal of the heat units that arises in the rings and films on account of the comparative slip between the two shafts.

In this arrangement (as well as in that illustrated in Figures 1 and 3) provision has been made furthermore of means for speedy discharge of the liquid when declutching is desired. For this purpose, the turning casing Q is provided with two classes of discharge openings, namely: a primary class of calibrated openings $g$ of cross section so that the delivery of liquid corresponds to the discharge of the heat units for an operation of the required movement of the shaft $2a$ in relation to the shaft $1a$; a second class of openings of large cross section G that are normally closed when the clutch is engaged and that may be opened up quickly when wishing to disengage.

These openings G are closed by balls or any suitable valves $h$. A lever system $l$ is operated at one and the same time by a sliding sleeve $m_1$ in the embodiments of Figs. 2 and 3. When the sleeve $m$ is moved to the right through any suitable form of control (not shown) the levers $h$ swivel round their axes, which opens up the large-section openings G; the apparatus is thus emptied quickly and the engagement is released. The control of the sleeve may be brought under the control for closing of the cock R for feeding the apparatus with liquid by levers that are not shown, so that a single operation shuts off the liquid inlet into the apparatus and opens apertures G that drain the latter quickly. The reverse operation closes the openings G and opens the cock for the liquid feed when wanting to engage.

In a modification of this arrangement, illustrated in Figure 1, the sleeve $m$ is in the form of an annular piston that is in the turning annular chamber C, described above. In this case compressing springs $R_5$ hold the piston $m$ constantly to the right; the strength of these springs is such that it keeps the apertures G open. When the cock R, for inlet of liquid into the apparatus, is opened, the annular chamber C fills up with liquid as was explained above and the liquid thrust on the piston sleeve $m$ moves the latter towards the left, the result of which is to close the openings G and enable the apparatus to be filled and engagement to take place. Conversely, when the liquid inlet is shut off, the turning annular chamber C empties partly into the apparatus and piston $m$ moves up to the stop $m_2$ on account of the action of the springs $R_5$ and the apertures G open up, thus causing the speedy drainage of the apparatus and its disengagement. The control of the opening and closing of the openings G by the lever system $h$ might be replaced, without going outside the scope of our invention, by a hydraulic or electromagnetic control brought under the control of the movement of the annular piston-sleeve $m$.

In the example illustrated in Figure 3, the automatic and progressive engaging is obtained through decreasing the thickness of the liquid ring-films by making use of the thrust of a liquid ring on a piston.

The primary shaft $2a$ drives the casing Q and the discs $d$ by means of paired longitudinal grooves $r_2$ into which peripheral projections on discs $d_2$ slidably extend, this casing carries a partition S at right angles to the axis of the apparatus.

The secondary shaft $1a$ is driven by a hub $M_1$ and the discs $d_1$ by means of paired axial grooves $r_1$ formed in cylindrical member $M_2$ and into which projections of discs $d_1$ slidably extend, $M_2$ being fixed to $M_1$.

An annular piston $P_4$ may slide longitudinally inside the casing Q. It may hasten the stacking of the discs by means of several spindles connected to an annular part $S_1$. The spindles pass in a watertight way through the partition S.

Springs $R_3$ constantly thrust the piston $P_4$ towards the left, together with spindles and member $S_1$ that are connected to it.

Springs, not shown, are placed respectively between the discs $d_1$ in the neighbourhood of the grooves $r_1$ and between the discs $d_2$ close to the grooves $r_2$ in order to tend to spread apart constantly these discs from each other; these springs, for instance, are formed by flexible washers.

Openings (O) enable communication to be made between the annular chamber $H_2$ on the right and $H_1$ on the left, while these two chambers are kept apart by the middle partition S. These openings O in the form of tubes enable the piston $P_4$ to be moved axially.

Openings of large cross section G may be opened in the manner described above by a system of levers $h$ swinging round axes $O_1$ connected to the casing Q. As an example only, there has been illustrated in this form of execution the feeding of a liquid ring by centrifugal force into the annular chamber C.

The operation is as follows:

The primary shaft $2a$ rotates as well as the driven parts: revolving casing Q, annular chamber C, partition S, piston $P_3$, discs $d_2$, the latter being spaced on account of the action of the springs $R_3$ and of springs located between discs $d_2$. The discs $d_1$ are likewise spaced apart through the action of the small springs located between them, the annular part $S_1$ bears against the partition S. The disengagement of the apparatus is therefore perfect, the discs $d_1$, the sleeve $M_1$ and the secondary axis $1a$ are stationary. In order to engage, the cock for feeding liquid is opened (not shown); the liquid comes into the turning annular chamber C, is centrifugally fed to and feeds the right chamber $H_2$ by entering into the communication holes T'. Vanes $j$ are fixed to partition S and casing Q in chamber $H_2$, and the liquid, drawn through the radial vanes $j$, goes through, under the action of the centrifugal force, the holes $t'$ of the sleeve $M_2$ and fills the interstitial spaces between the discs $d_1$ and $d_2$. There is already the start of a torque owing to effect of viscosity in these liquid rings $a$. The chamber on the right continues to fill up and the liquid overflows through the action of the centrifugal force and through the openings O into the chamber $H_1$ on the left of partition S, as viewed in Fig. 3. There then occurs a thrust on the piston $P_4$. When the thrust is greater than the paired action of the springs $R_3$ and of the springs placed between the two sets of discs, the piston $P_4$ by means of the spindles $S_1$ moves the discs $d_1$ and $d_2$ close to each other decreasing the thickness of the liquid ring-films $a$; there is then progressive engaging through the effect of viscosity in these rings, the discs $d_1$ of the sleeve $M_2$ and the secondary shaft $1a$ are thus driven. Obviously, the sizes of the discs, their number, the sizes of the piston $P_4$ and the strength of the springs are consequently calculated so that the driving occurs solely through viscosity effect so as to preserve a difference of angular speeds between the shafts $1a$ and $2a$ and thus damp vibrations that may originate from the motor, for instance, driving the shaft $2a$. Under the effect of the centrifugal forces, the liquid that comes in through the holes T' drains out through the calibrated jets $g$ after going into the ring-films $a$, which enables the heat units to be expelled.

If the speed of the primary shaft $2a$ decreases, the thrust on the piston $P_4$ likewise gets less. By proper calculating consequently the dimensions of the springs and the sizes of the piston $P_4$, it happens for a certain rotary speed (idling speed of the motor for instance) speed at which the thrust on the piston $P_3$ becomes less than that of the springs, that the discs move apart from each other under the influence of the small springs placed between them and of the thrust of the liquid rings $a$ on the surfaces of the discs and there is disengagement. The residual torque owing to the viscosity in the rings $a$ becomes very small since the thickness of these rings is appreciably enlarged. In certain adaptations, this disengagement will be enough, as this residual couple is not significant. If a complete disengagement is required in other forms of adaptation, all that will have to be done is to close the feeding of liquid of the apparatus and to open at one end the same time through a paired device for instance the openings G of large section by means of the levers $h$ and any suitable mechanisms not shown. In certain adaptations (railway haulage for instance) when compressed air is available, it will be possible to get speedy disengagement by sending into the annular chamber $H_3$ compressed air by means of holes $v_1$ and $v_2$ drilled in the axis and of a turning joint not shown. The pressure of this air is such that the thrust on the piston $P_1$ pushes the latter towards the left and operates the disengagement.

It must be observed that in all these modifications the liquid used may be selected according to the special form of apparatus to be carried out: for instance water, oils, silicon compounds.

On the other hand, our invention may be adapted to the most varied types of transmission such as more particularly, motor cars, railway engines, rail-cars, ships, aircraft, winch control, drilling machinery for sinking of pits, pumps, ventilators, etc.

We claim:

1. Power transmission apparatus comprising, in combination, a driving shaft; a casing fixed to said driving shaft and being formed with an inlet opening, a set of first outlet openings, and a set of second outlet openings of a larger size than said first outlet openings; a plurality of first annular transmission members located in and connected to said casing and extending about the axis of said driving shaft; a driven shaft coaxial with said driving shaft; a plurality of second annular transmission members extending about said axis, also being located in said casing, alternating with said first annular transmission members along the axis of said shafts, and overlapping said first transmission members; mounting means mounting said second transmission members on said driven shaft for rotation therewith; a stationary housing turnably supporting said shafts and located about said casing; liquid moving means communicating with said inlet opening of said casing for supplying liquid to the interior of said casing so that the liquid will be located between said annular members to transmit a drive from said first annular members to said second annular members so that said driving shaft drives said driven shaft through said annular members and liquid, said first outlet openings being unobstructed so that liquid is continually discharged through said first outlet openings to the interior of said stationary housing, and said liquid moving means communicating also with said housing to receive liquid therefrom so that the liquid is continuously circulated from said annular members to said liquid moving means and from the latter back to said annular members; and control means associated with said second outlet openings for controlling the discharge of liquid therethrough so that the rate of discharge of liquid from said casing may be regulated.

2. Power transmission apparatus comprising, in combination, a driving shaft; a casing fixed to said driving shaft and being formed with an inlet opening and a plurality of outlet openings; a plurality of first annular transmission members located in and connected to said casing and extending about the axis of said driving shaft; a driven shaft coaxial with said driving shaft; a plurality of second annular transmission members extending about said axis, also being located in said casing, alternating with said first annular transmission members along the axis of said shafts, and overlapping said first transmission members; mounting means mounting said second transmission members on said driven shaft for rotation therewith; a stationary housing turnably supporting said shafts and located about said casing; centrifugal liquid feeding means communicating with said inlet opening of said casing for centrifugally feeding a liquid to the interior of said casing; a piston located in said centrifugal liquid feeding means for movement upon a change of liquid pressure in said feeding means; a plurality of valves respectively cooperating with some of said outlet openings for controlling the discharge of liquid therethrough; linkage means connected to said valves and piston for automatically controlling said valves by the movement of said piston in said centrifugal liquid feeding means; spring means operatively connected to said linkage means for urging said valves to an open position in which said outlet openings are open; and liquid conveying means for conveying a liquid from said outlet openings to said centrifugal feeding means.

3. Power transmission apparatus comprising, in combination, a driving shaft; a casing fixed to said driving shaft and being formed with an inlet opening and a plurality of outlet openings; a plurality of first annular transmission members located in and connected to said casing for rotation therewith and axial movement therealong, said first transmission members extending about the axis of said driving shaft; a driven shaft coaxial with said driving shaft; a plurality of second annular transmission members extending about said axis, also being located in said casing, alternating with said first annular transmission members along the axis of said shafts, and overlapping said first transmission members; mounting means mounting said second transmission members on said driven shaft for rotation therewith and for axial movement along the axis thereof; centrifugal liquid feeding means communicating with said inlet opening for supplying liquid to the interior of said casing so that the liquid becomes located between said annular members to transmit a drive from said first annular members rotating with said driving shaft to said second annular members to rotate said driven shaft; a piston located in said casing and communicating with said liquid feeding means to be moved by liquid fed thereby; spring means operatively connected to said piston for moving the latter against the action of liquid fed by said centrifugal feeding means; motion transmitting means operatively connected to said piston for transmitting movement thereof to said annular members for locating said annular members closer to each other upon movement of said piston under the influence of liquid fed by said liquid feeding means; and means for conveying liquid from said outlet openings to said liquid feeding means.

4. Power transmission apparatus as defined in claim 3 and wherein said mounting means includes a sleeve located in said casing, supporting said second transmission members, and being formed with a plurality of openings passing therethrough; partition means forming part of said casing and located respectively adjacent opposite ends of said sleeve to form with said sleeve a chamber, said chamber communicating with said centrifugal liquid feeding means to receive liquid therefrom; and a plurality of vanes fixed to said partition means to rotate with said casing and being located in said chamber to centrifugally direct liquid through said sleeve openings to the spaces between said transmission members.

5. Power transmission apparatus comprising, in combination, a driving shaft; a casing fixed to said driving shaft and being formed with an inlet opening and a plurality of outlet openings; a plurality of first annular transmission members located in and connected to said casing and extending about the axis of said driving shaft; a driven shaft coaxial with said driving shaft; a plurality of second annular transmission members extending about said axis, also being located in said casing, alternating with said first annular transmission members along the axis of said shafts, and overlapping said first transmission members; mounting means mounting said second transmission members on said driven shaft for rotation therewith; centrifugal liquid feeding means communicating with said inlet opening to feed liquid into the interior of said casing so that the liquid becomes located between said annular members for transmitting a drive from said first to said second annular members; and means for conveying liquid continuously from some of said outlet openings of said casing and at given times from the remaining outlet openings of said casing to said centrifugal liquid feeding means.

References Cited in the file of this patent

UNITED STATES PATENTS

| | | |
|---|---|---|
| 973,893 | Tichomiroff | Oct. 25, 1910 |
| 1,238,447 | Severy | Aug. 28, 1917 |
| 1,482,167 | Varley | Jan. 29, 1924 |
| 1,761,694 | Sweet | June 3, 1930 |
| 2,079,724 | Van Ranst | May 11, 1937 |
| 2,576,156 | Trofimov | Nov. 27, 1951 |

FOREIGN PATENTS

| | | |
|---|---|---|
| 448,977 | Germany | Sept. 6, 1924 |
| 705,118 | Germany | Mar. 13, 1941 |